United States Patent [19]

Hoggard et al.

[11] Patent Number: 4,870,037
[45] Date of Patent: Sep. 26, 1989

[54] PREVENTION OF AL₂O₃ FORMATION IN POURING NOZZLES AND THE LIKE

[75] Inventors: Dale B. Hoggard; Han K. Park, both of Pittsburgh, Pa.

[73] Assignee: Vesuvius Crucible Company, Pittsburgh, Pa.

[21] Appl. No.: 100,080

[22] Filed: Sep. 23, 1987

Related U.S. Application Data

[63] Continuation-in-part of Ser. No. 853,908, Apr. 26, 1986, abandoned.

[51] Int. Cl.⁴ ............................................. C04B 35/58
[52] U.S. Cl. ........................................ 301/97; 501/98; 501/100
[58] Field of Search ............................ 501/97, 98, 100

[56] References Cited

U.S. PATENT DOCUMENTS

| | | | |
|---|---|---|---|
| 4,205,033 | 5/1980 | Hattori et al. | 264/65 |
| 4,528,244 | 7/1985 | Winkelbauer et al. | 428/446 |
| 4,540,674 | 9/1985 | Watanabe et al. | 501/97 |
| 4,605,635 | 8/1986 | Zenbutsu et al. | 501/96 |

FOREIGN PATENT DOCUMENTS

| | | | |
|---|---|---|---|
| 42-16044 | 9/1967 | Japan . | |
| 54-22418 | 2/1979 | Japan | 501/97 |
| 54-38309 | 3/1979 | Japan | 501/97 |
| 57-129873 | 8/1982 | Japan | 501/98 |
| 60-16866 | 1/1985 | Japan | 501/99 |
| 60-246210 | 12/1985 | Japan | 501/97 |
| 2110971 | 6/1983 | United Kingdom . | |
| 2111880 | 7/1983 | United Kingdom . | |
| 2170131 | 7/1986 | United Kingdom . | |

OTHER PUBLICATIONS

Yamaguchi, "Latest Tendency of Graphite/Alumina Refractories for Continuous Casting Systems"; *Jour. of The Institute of Refractories Eng.;* (Summer, 1987), pp. 18–23.

*Primary Examiner*—William R. Dixon, Jr.
*Assistant Examiner*—Deborah Jones
*Attorney, Agent, or Firm*—Webb, Burden, Zeisenheim & Webb

[57] ABSTRACT

The invention is directed to a lining composition for submerged entry pouring nozzles and like shapes used in the continuous casting of metals, particularly aluminum killed, low carbon steels. The lining prevents harmful buildup of alumina and other oxides within the nozzle bore which may cause premature nozzle clogging. The nozzle liner comprises a carbon-bonded, SiAlON-graphite refractory material. Small amounts of antioxidants and additional amounts of less expensive refractory grain or powder are also added to dilute the more expensive SiAlON material.

15 Claims, 1 Drawing Sheet

U.S. Patent  Sep. 26, 1989  4,870,037
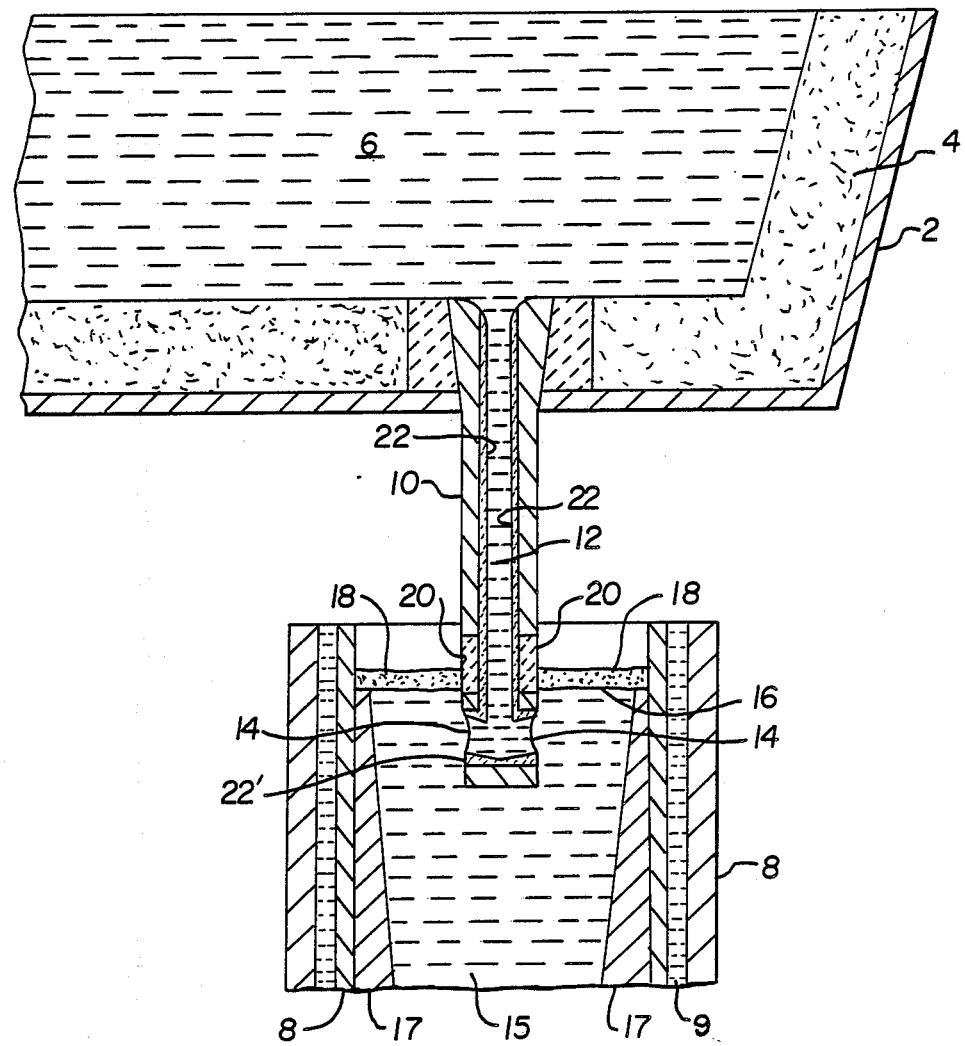

PREVENTION OF $Al_2O_3$ FORMATION IN POURING NOZZLES AND THE LIKE

CROSS-REFERENCE TO RELATED APPLICATIONS

This patent application is a continuation-in-part application of U.S. Ser. No. 853,908, filed Apr. 26, 1986, in the names of Dale B. Hoggard and Mark K. Fishler and assigned to Vesuvius Crucible Company, the assignee of the present patent application.

BACKGROUND OF THE INVENTION

In the continuous casting of steel, special refractories are used to control the flow of the molten steel and protect the molten steel from oxidation as it is poured from steel ladles to tundishes and from tundishes to continuous casting molds. Such refractories includes lide gate plates or stopper rods used in molten metal flow control, various collector nozzles in ladles and tundishes, and protective ladle shrouds and submerged pouring nozzles employed to protect molten metals from oxidation. THese types of specialty refractories are subjected to severe operating conditions such as thermal shock, molten steel erosion, and slag attack.

Such specialty refractories are usually carbon-containing refractories and, more specifically, carbon-bonded refractories. They are usually composed of refractory grain such as aluminum oxide, zirconium oxide, clays, magnesium oxide, silicon carbide, silica, or other dense grain of specific mesh size; carbon from flake graphite, amorphous graphite, carbon black, coke and like forms; and a carbonaceous binder derived from pitch or resin.

Some oxidation takes place during the manufacture of steel, and considerable amounts of oxygen may dissolve in the molten metal. In the ensuing solidification of the steel during casting, much of the dissolved gas is expelled and, in the case of oxygen, it reacts with carbon to produce evolved carbon monoxide. The dispelled oxygen, carbon monoxide and other gases create undesirable porosity, cracks, and internal defects which lower the quality of the finished steel. In order to eliminate the problem of dissolved oxygen, molten steels are deoxidized or "killed" by the addition of aluminum metal, ferromanganese, or ferrosilicon. In the case of aluminum-killed steel, the aluminum reacts with dissolved oxygen or iron oxide to form finely-dispersed aluminum oxide, some of which floats into the slag above the molten steel and some of which remains as highly-dispersed micro particles in the solidified steel. During continuous casting, this extremely fine dispersed portion of alumina has a tendency to either precipitate out of the molten steel onto the cooler refractory surfaces or react and stick to the ceramic refractories that control the molten steel in its path from ladle to tundish to casting mold.

This precipitated alumina has a particular affinity to the typical carbon-bonded alumina-graphite refractories commonly utilized as ladle shrouds and submerged pouring nozzles, the latter also referred to as a subentry nozzle or simply as "SEN". The alumina will continue to build up in the interior of the SEN until the flow of molten steel is reduced to a point where the tube must be lanced open by an oxygen torch or the SEN is discarded. If oxygen lancing becomes necessary, the casting process is disrupted costing time and money, casting efficiency decreases, and the quality of the steel must be downgraded. A total alumina blockage of a SEN decreases the expected life of the refractories and is very costly to steel producers. In alumina-killed steels where high dissolved-oxygen concentrations are expected, the useful life of a submerged pouring nozzle may be limited to 2-3 ladles due to heavy alumina buildup on the interior diameter of the tube.

Heretofore, one of the solutions to this problem has been the development of an argon injected SEN, which allows high pressure argon to permeate the porous interior diameter of the nozzle during casting, thereby forming a protective layer of inert gas which hinders the bonding of the dispersedalumina to the refractory. The argon also reduces the oxygen partial pressure at the refractory-molten metal interface, again decreasing the possibility for adherence of alumina deposits. Exemplary of such is the gas permeable immersion pouring nozzle disclosed in UK patent application GB 2,111,880 A, to Gruner et al. The argon-injection technology has extended SEN life a step further at an ever increasing cost—the expense of large volumes of argon required during casting and the increased manufacturing costs of the more complex SEN-argon nozzles. It has been observed as well that the argon may introduce objectionable pinholes into the cast steel through absorption and subsequent expulsion of the gas as the molten metal solidifies.

It has also been proposed to provide a pouring nozzle with a lower melting point liner composition which prevents alumina buildup. Liner materials developed to date include the use of $CAO-MgO-Al_2O_3$ liners, as disclosed in UK patent application GB 2,170,131 A to Tate, which develop low melting eutectics (between 1350° C.-1600° C.) which are washed out of the nozzle as alumina is deposited and reacts with the liner. The melting action prevents the alumina buildup and allows for the free flow of molten steel. Also reported to be effective in prevention of alumina adhesion is a sleeve of Magnesium oxide (MgO) according to UK patent application GB 2,135,918 to Rosenstock et al.

It has still further been proposed in UK patent application GB 2,110,971 A to Kurashina et al. to provide a submerged nozzle of a modifiedgeometry wherein the lower portion of the inner nozzle diameter is greater than the top, with an angled step therebetween to prevent blockage of the flow passage. The upper portion of the nozzleis comprised of alumina-graphite and the lower portion is zirconia-graphite.

The present invention provides a method of preventing $Al_2O_3$ buildup during casting and an article of manufacture of a refractory composition that is formed as an interior liner on submerged pouring nozzles, ladle shrouds, collector nozzles and like components. The invention thus inhibits the buildup of alumina and other oxides on such specialty refractories used in the flow control and protection of molten steel during continuous casting of aluminum-killed steels and the like.

Still further,the present invention provides an interior liner composition for subentry pouring nozzles which substantially prevents alumina from adhering to the refractory by improving the nonwetting characteristics at the molten metal/nozzle interface. The invention provides a nozzle liner of a composition having similar thermal expansion properties tot he alumina-graphite and zirconia-graphite refractories presently in use so as to prevent cracking during firing in manufacture and during casting operations. Still further, the liner composition of the present invention provides superior steel erosion resistance, similar to the aluminagraphite body of existing SEN nozzles to allow for long casting sequences and low permeability to decrease the opportunity for unwanted exidation.

The present invention further provides a submerged pouring nozzle or SEN for continuous casting of killed steels which resists buildup of alumina on a level equal to or better than the current argon SEN. The SEN of the present invention includes a liner material which is simultaneously pressed and fired with the other conventional refractories comprising the nozzle. The invention thus achieves the desired goal of reducing alumina buildup to superior levels without the need for expensive inert gas hardware and the complicated and expensive gas permeable nozzles heretofore required in such practice.

SUMMARY OF THE INVENTION

Briefly stated, the present invention provides a method and a refractory article for minimizing alumina and other oxide buildup in pouring nozzles and like shapes during the continuous casting of aluminum-killed steels. A pouring nozzle according to the present invention comprises a nozzle body having a central bore extending axially therethrough from an inlet end to an outlet end. The nozzle body is preferably formed of a conventional carbon-bonded, alumina-graphite refractory and may also contain a slagline sleeve around a circumferential portion of the exterior in contact with the molten slag. The slagline sleeve may be a conventional zirconia-graphite refractory or it may be formed of an improved carbon-bonded SiAlON composition disclosed in the above-referenced, copendig patent application, Ser. No. 853,908. The central bore of the nozzle body includes an integral lining therearound of a SiAlON-graphite composition set forth below. The nozzle further includes exit ports at the outlet end which also preferably are lined with the carbon-bonded SiAlON material of the present invention so as to minimize unwanted alumina formations and thus preclude blockage of molten metal flow. The liner material can conveniently be isostatically pressed simultaneously with the alumina-graphite body and the zirconia-graphite or SiAlON-graphite slagline sleeve and then fired in a reducing atmosphere. The finished or fired liner thickness in the nozzle bore is preferably between about 5 to 25 mm (millimeters) in thickness, the thickness being dependent upon the continuous casting conditions and the quality of the steel.

In accordance with the present invention, a method is provided to resist alumina or other oxide buildup in a subentry nozzle or refractory like shape during continuous casting of steel, comprising the steps of providing a refractory shape having a liner adapted to contact the molten steel of a composition within a preferred range and consisting essentially of:

| Constituent | Amount in Weight % |
| --- | --- |
| (a.) Carbon | about 4–50% |
| (b.) SiAlON ($Si_{6-z}Al_zO_zN_{8-z}$) where 0 z 5 | about 20–90% |
| (c.) Antioxidant ($B_4C$ and the like) | about 2–8% |
| (d.) Binder - (Pitch, Resin or the like) | about 0–10% |
| (e.) Diluting refractory grains ($SiO_2$, $Al_2O_3$, $ZrO_2$ and the like) | about 0–70%; | and passing molten steel over said liner composition, whereby alumina or other oxide buildup is resisted so as to extend the life of the nozzle or like shape.

BRIEF DESCRIPTION OF THE DRAWING

The drawing figure depicts a partially fragmented, cross-sectional side view of a bottom pour tundish with a subentry nozzle having an anti-alumina buildup liner of the present inventionshown delivering molten metal to a continous casting mold.

DETAILED DESCRIPTION OF THE INVENTION

In the drawing, a subentry nozzle (SEN) 10 is shown in place on a conventional bottom pour tundish 2. The tundish has a refractory lining 4 which contains a molten bath of metal 6, for example, aluminum-killed steel, which is transferred by way of the nozzle 10 to a conventional continuous casting mold 8. The mold 8 includes a water jacket 9 therearound for chilling of the mold. The nozzle 10 has an internal bore 12 extending axially from an inlet end at the tundish 2 to an outlet end positioned within the mold 8. A plurality of exit ports 14 are formed at the outlet end of the nozzle and communicate with the internal nozzle bore 12. During a continuous casting run, the molten steel 6 flows from the tundish 2 to the SEN 10, passes through the internal bore 12 and exits the nozzle via ports 14 beneath a surface 16 of the molten metal. The discharge end of the SEN is thus positioned within the interior of a molten metal core 15 of a solidified strand 17 which slowly descends from the bottom of the mold 8. Use of a submerged entry nozzle, such as SEN 10, prevents splashing and oxidation of the molten steel, among other well known advantages. A commonly used refractory for the body of nozzle 10 is alumina-graphite which is particularly suited for this environment due to its excellent thermal shock resistance and steel erosion resistance.

It is also common in continuous casting operations to employ a layer of mold powder above the metal surface 16 in order to capture and prevent entry of nonmetallic inclusions in the molten metal. In addition, the mold powder serves as a lubricant and provides surface protection for the strand of metal 17 as it leaves the mold 8. Commonly used mold powders are comprised of mixtures of oxides having a relatively low melting point which form a molten slag layer 18 that floats on the surface 16 of the molten metal in the mold. It is observed that the area of a subentry nozzle in contact with the slag layer 18, referred to as the slagline or powder line area, undergoes corrosion or erosion at a higher rate than the balance of the nozzle body. In order to extend the life of the alumina-graphite nozzle body 10, it is common to provide subentry nozzles with a slagline sleeve or insert 20, of a material which is of a higher resistance to the mold powder slag attack. Such materials which may be used as a suitable refractory for the slagline sleeve 20 are a known zirconia-graphite refractory or the novel carbon-bonded SiAlON compositions set forth in co-pending application Ser. No. 853,908.

With nozzle life effectively extended through the use of such improved slagline materials, the limiting factor affecting nozzle life has now become its ability to remain open during casting. The use of improved commercial zirconia-graphite slagline sleeves has increased the normal life expectancy of the average alumina-graphite submerged pouring nozzle up to 2-6 ladles of steel during continuous casting. The longer casting times have thus magnified the clogging problem found characteristic of alumina-graphite nozzles. As discussed above, there is a tendency for dispersed alumina, expecially in aluminum-killed steels, to precipitate on and adhere to the cooler interior diameter surfaces of the alumina-graphite SEN. This buildup normally continues until the flow of steel is restricted or blocked, requiring oxygen lancing to restore normal flow. Often times the SEN must be discarded and replaced due to alumina blockage.

We have discovered that a refractory liner 22 formed around the central nozzle bore 12 and a liner 22' around the exit ports 14 of a SiAlON-graphite composition, described below, dramatically increases the life of the nozzle 10, exceeding that of argon injected nozzles which heretofore have offered superior anti-alumina buildup characteristics. A nozzle 10 having a liner 22 and 22' according to the present inventio resists the formation and buildup of alumina or other oxides, during the continuous casting of aluminum-killed steel and the like. A preferred starting raw material composition for the carbon bonded SiAlON liner 22 and 22' refractory consists essentially of, in weight percent:

| | |
|---|---|
| (a) Carbon (C) | about 4–50% |
| (b) SiAlON, wherein the SiAlON has a composition ($Si_{6-z}Al_zO_zN_{8-z}$) having one or more "z" values within a range of greater than zero to five. | about 20–90% |
| (c) Antioxidant constituent, such as SiC, $SiO_2$, $B_4C$, Boron compounds, aluminum, silicon, other silicon-containing compounds, other glass-forming compounds, or the like. | about 2–8% |
| (d) Carbonaceous binders selected from pitch or resin or some other carbonaceous material; and | about 0–25% and preferably about 2–15% |
| (e) Other diluting refractory grains or powders well known in the refractory industry such as clay, alumina, zirconia, zircon, silica, silicon carbide, mullite, chromia, iron chromite, magnesia, magnesium aluminate, or the like, or lesser known refractory materials such aluminum nitride, boron nitride, or the like. | about 0–70% |

Thus, the liner composition is prepared by combining SiAlON grain or fine powder and elemental carbon, preferably graphite. Additional known refractory grain may also be added to the mixture, as less expensive dilutents, which are then blended with a carbonaceous binder, such as resin or pitch, along with a known antioxidant, such as SiC, $SiO_2$, $B_2O_3$ or other boron compounds or like antioxidant materials. The carbonaceous binder is employed to give the pressed and cured shaped mechanical strength prior to firing. The binder loses about 50% of its initial weight during thermal treatment. The carbonaceous binder, depending on the amount used, thus contributes from trace amounts up to about 13% by weight of the final carbon content of the composition after firing. The liner material 22 and 22' is preferably isostatically pressed simultaneously with the nozzle body 10 and the slagline sleeve 20 to produce the composite nozzle or SEN shown in the drawing. The pressed composite is cured and fired in a known manner in a reducing atmosphere, usually at temperatures between about 800° C. and 1500° C. As shown in the drawing, the liner 22 surrounds the internal nozzle bore 12 while the liner portions 22' surround the outlet ports 14 of the SEN 10. The thickness of liner portions 22 and 22' is preferably between about 5 to 25 mm, the thicknesses chosen being dependent upon dependent anticipated casting conditions and steel qualtiy.

A typical SEN such as the submerged nozzle 10 shown in the drawings may be a carbon containing shape made up of two different refractory compositions. The main body portion of such a commonly used nozzle maybe composed of a carbon-bonded alumina-graphite material. Heretofore alumina-graphite refractory has been successfully used as a submerged pouring nozzle material in the continuous casting of steel due to its excellent thermal shock resistance and erosion resistance. The slagline area 20 is preferably made of a known carbon-bonded zirconia-graphite material or of the SiAlON carbon-bonded refractory referred to herein and in the referenced co-pending patent application, Ser. No. 853,908. Typical chemistries of a commercialalumina-graphite body 10 and zirconia-graphite slagline sleeve 20 with which the liner of the present invention may be used are set forth below in Table I, by weight percent.

TABLE I

| | Nozzle Body (10) Alumina Graphite | Slagline Sleeve (20) Zirconia Graphite |
|---|---|---|
| C | 32 wt. % | 16.5 wt. % |
| $Al_2O_3$ | 52 wt. % | 1.0 wt. % |
| $SiO_2$ | 14 wt. % | 2.0 wt. % |
| Minor | 2 wt. % | 1.5 wt. % |
| $ZrO_2$ | — | 75.0 wt. % |
| CaO | — | 4.0 wt. % |

SiAlON is defined as a solid solution and/or dispersion of aluminum oxide and aluminum nitride throughout a silicon nitride matrix. Generally, SiAlON is described as a refractory material composed of at least 80% by weight of silicon-aluminum oxynitride which has a crystal structure based upon beta silicon nitride ($Si_3N_4$), but of increased unit cell dimensios which obeys the formula:

$$Si_{6-z}Al_zO_zN_{8-z}$$

where "z" is greater than zero but less than or equal to five. The SiAlON grain used herein was produced by the carbothermal reduction of alumina-silica materials in nitrogen.

In the examples described below, the particle sizes of the SiAlON, and other refractory grains and powders used in making the various test compositions, ranged from less than about a −4 mesh (U.S. Standard Seive Size) for the grain, down to about 0.5 microns average particle size for the fine powders. Grains and powders having a particlesize intermediate those two extremes are suitable for use as starting materials in practicing our invention. The elemental carbon addition in the mixture may be in the form of graphite, carbon black, petroleum coke or the like. In the examples presented below, the carbon additions were made using graphite in the form of natural vein or flake graphite, commonly referred to as crystalline graphite, with a carbon content of greater than about 70% by weight. The particle size of the graphite is preferably less than −8 mesh, U.S. Standard.

The flake graphite has a platelet structure which may be preferred in certain applications due to its high thermal conductivity.

testing. The alumina buildup resistance parameter is the average value of the number of test samples indicated. Table II follows hereinafter.

TABLE II

| Composition/Properties | Composition No. (Weight %) | | | | | | | | | | | |
|---|---|---|---|---|---|---|---|---|---|---|---|---|
| | #1 | #2 | #3 | #4 | #5 | #6 | #7 | #8 | #9 | #10 | #11* | #12** |
| C | 28 | 28 | 29 | 28 | 22 | 27 | 18 | 31 | 29 | 34 | 32 | 16.5 |
| SiAlON (z =1.5) | 67 | 67 | 66 | 42 | 36 | 43 | — | 18 | 53 | 28 | — | — |
| SiAlON (z =3) | — | — | — | — | — | — | 48 | 49 | — | — | — | — |
| $Al_2O_3$ | — | — | — | — | — | — | — | — | — | — | 52 | 1 |
| $ZrO_2$ | — | — | — | — | 38 | 27 | 31 | — | — | — | — | 75 |
| $SiO_2$ | 1 | 1 | 1 | 1 | 0.5 | — | — | — | 14 | 15 | 14 | 2 |
| CaO | — | — | — | — | 2 | 1.5 | 1.5 | — | — | — | — | 4 |
| Antioxidant | 4 | 4 | 4 | 4 | 3.5 | 2 | 2.5 | 3 | 4 | 4 | — | — |
| AlN | — | — | — | 25 | — | — | — | — | — | — | — | — |
| BN | — | — | — | — | — | — | — | — | 20 | — | — | — |
| Minor | — | — | — | — | — | — | — | — | — | — | 2 | 1.5 |
| No. of Test Samples: | 2 | 7 | 5 | 10 | 4 | 4 | 4 | 2 | 3 | 4 | 45 | 5 |
| Alumina Buildup Resistance Ranking: (1 = excellent, 4 = poor) | 1.4 | 1.5 | 1.7 | 1.8 | 1.8 | 1.8 | 1.6 | 1.3 | 1.4 | 1.8 | 3.4 | 2.3 |

*Standard Alumina-Graphite
**Standard Zirconia-Graphite

EXAMPLE I

In the following example, two SiAlON compositions were made, wherein z=1.5 and z=3. SiAlON grain was obtained by sintering with yttria at 1700° C. The grain was crushed and sized and iron magnetically removed.

Various compositions of carbon-bonded SiAlON-graphite were mixed and blended, isostatically pressed into cylinders 50 mm ID×115 mm OD×180 mm 1 g. and fired in a reducing atmosphere. Bars were cut from the cylinders 20 mm×20 mm×150 mm 1 g. and were mounted in sets of four for steel erosion and alumina buildup testing. A low carbon 1010 steel scrap was melted by induction in an MgO crucible. In order to obtain the maximum concentration of aluminum oxide in the molten steel, the steel oxygen level was increased and carbon content decreased by directly injecting gaseous oxygen into the molten bath, following which 0.2-0.5% aluminum metal was added and temperature stabilized between 1680°-1720° C.

The aluminum metal was added to the molten steel to deoxidize or "kill" the steel. The four sample bars as a test group, were mounted together, immersed in the aluminum-killed steel, and rotated for 10 minutes at 20 revolutions per minute. Following the tests, a thick coat of fine powdery alumina was deposited on certain samples having a tendency toward alumina buildup in practice. To differentiate between compositions, alumina buildup for each sample was described and documented. Based on these physical observations, each sample was ranked against the others in the set of four. A ranking of "one" indicating excellent resistance to alumina buildup; a ranking of "four" indicating poor resistance to the buildup of alumina. After several tests, the buildup resistance ranking was averaged and the material ranked according to its cumulative performance. Although not quantitative in nature, the buildup ranking is a convenient and effective indicator of the susceptability of refractory composites to alumina buildup problems.

Reported below in Table II, is a summary which details the fired composition and the comparative alumina buildup rankings of the improved carbon-bonded SiAlON liner compositions tested. These results are compared to the known alumina-graphite and zirconia-graphite materials which served as standards during The above test results reported in Table II demonstrate that liner materials in accordane with the present invention, represented by Composition Nos. 1 through 10, based on the carbon-bonded SiAlON system, are clearly superior to the standard alumina-graphite (Composition No. 11) and also superior to the zirconia-graphite refractory (Composition No. 12) in terms of alumina buildup resistance. It is also observed that SiAlON material of differing "z" values can be mixed, as in Composition No. 8, to produce superior anti-alumina formation properties in a nozzle liner.

EXAMPLE II

Several full-size submerged pouring nozzles such as nozzle 10 of the present invention with the anti-alumina buildup liner composition shown in Table III, below, were isostatically pressed, fired, and tested as trial pieces at a commerical steel manufacturer that specializes in continuous casting of low carbon aluminum-killed steel.

TABLE III

| (in weight percent) | |
|---|---|
| C | 29% |
| SiAlON (z = 1.5) | 67 |
| $SiO_2$ | 1 |
| Antioxidant | 3 |

The submerged nozzle 10 of the present invention with the SiAlON-graphite liner composition of Table III was tested side-by-side in a twin strand caster with a commerical SEN argon injected nozzle. The SEN argon was a commercial submerged nozzle designed to allow pressurized argon gas to permeate the interior lining of the nozzle commonly used to prevent alumina buildup and internal clogging. The SEN argon nozzle of the type tested has heretofore offered superior anti-buildup performance. These test nozzles were positioned so as to transfer the molten steel from the tundish into the continuous casting molds. Type 2848 steel was continuously cast at ladle temperatures of about 1544°-1570° C. The casting tests indicated that the nozzle 10 having the SiAlON-graphite anti-buildup liner 22 and 22' functioned flawlesslyfor a nine ladle sequence. This is approximately double the number of ladle pours normally expected from submerged nozzles without a liner or without argon injection. The SEN argon control nozzle which ran side-by-side with the SiAlON-graphite lined SEN 10 required lancing with oxygen after the seventh ladle pour and was totally blocked after the ninth ladle. Thus, the need for expensive argon injection is eliminated by the SEN 10 nozzle of the present invention.

The mechanism of alumina buildup in submerged nozzles appears to relate to the wetting and freezing of molten steel as well as the precipitation of alumina on the cooler refractory surfaces, after which the deposits grow from the nucleated sites. The SiAlON-graphite liner of the invention develops a vitreous, high melting glassy layer at the liner-molten steel interface due to oxidation of the silicon nitride material during casting. This glassy boundary has been shown to be passive and quite protective during mormal preheat operations and it is expected that similar characteristics are evident in a molten steel environment, resulting in controlled erosion of the liner. It is theorized that the controlled erosion of the SiAlON-graphite liner also prevents the nucleation of alumina and hinders the buildup of alumina deposits. Nucleation and buildup of oxides other than alumina are also resisted.

While specific embodiments of the inventin have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

Patent No. 4,870,037
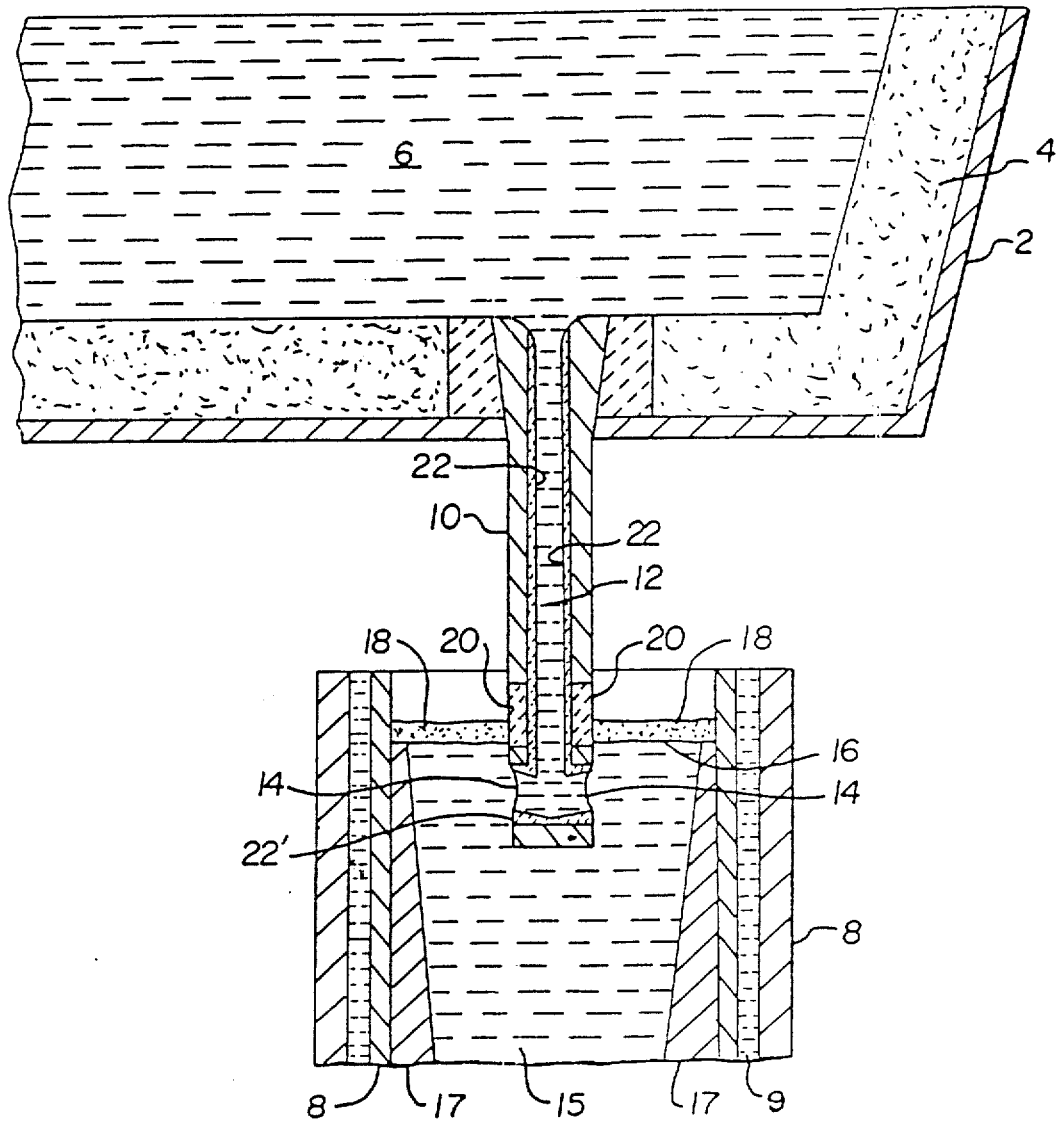

What is claimed is:

1. An article for use in casting molten metal wherein said article includes a molten metal contacting surface of a carbon-bonded refractory composition for resisting oxide buildup consisting essentially of, by weight:
   (a) carbon from about 4% to about 50% supplied predominantly from a graphite source;
   (b) fully reacted SiAlON in an amount of from about 20% to about 90% and wherein the SiALONhas a composition represented by a formula $Si_{6-z}Al_zO_zN_{8-z}$ having one or more z values between a number greater than zero and less than or equal to five;
   (c) an antioxidant constituent comprising at least one member selected from the group consisting of silicon and boron-containing compounds in an amount from about 2% to about 8%; and
   (d) a diluent constituent comprising at least one member selected from the group consisting of clay, alumina, zirconia, zircon, silica, silicon carbide, mullite, chromia, iron chromite, magnesia, magnesium aluminate, aluminum nitride, boron nitride and the like, in an amount of from a trace amount up to about 70% by weight.

2. The article of claim 1 wherein a portion of said carbon content is supplied by a non-graphite carbonaceous binder material in an amount of up to about 13% by weight.

3. The article of claim 2 wherein the non-graphite carbonaceous binder material is supplied from a source comprising at least one member selected from the group consisting of pitch and resin.

4. The article of claim 1 wherein said article is a refractory subentry nozzle for continuous casting.

5. The article of claim 4 wherein the nozzle comprises a body portion of alumina-graphite material, said body having an internal bore having a lining therearound comprising said oxide buildup resisting refractory composition.

6. The article of claim 6 wherein the subentry nozzle includes an external slagline sleeve area comprising a refractory material resistant to molten slag attack.

7. The article of claim 6 wherein the slagline sleeve material is zirconia-graphite.

8. The article of claim 6 wherein the slagline sleeve includes a carbon-bonded, SiAlON-graphite material.

9. The article of claim 4 wherein the nozzle is for use in the continuous casting of low-carbon, killed steel.

10. The article of claim 1 wherein the fully reacted SiALON is produced by a carbothermal reduction of alumina-silica materials in nitrogen.

11. A subentry nozzle for use in continuous casting of molten steel comprising:
   a body portion of a refractory material having a central axial bore for conveyance of molten steel therethrough from an inlet end to an outlet end of said body;
   a lining portion surrounding said central bore and adapted to be in contact with said molten steel, said lining portion of a carbon-bonded refractory composition consisting essentially of, by weight:
   (a) carbon from about 4% to about 50% supplied predominantly from a graphite source;
   (b) fully reacted SiALON in an amount of from about 20% to about 90% and wherein the SiALON has a composition represented by a formula $Si_{6-z}Al_zO_zN_{8-z}$ having one or more z values between a number greater than zero and less than or equal to five;
   (c) an antioxidant constituent selected from the group consisting of silicon and boron-containing compounds in an amount from about 2% to about 8%; and
   (d) a diluent constituent comprising at least one member selected from the group consisting of clay, alumina, zirconia, zircon, silica, silicon carbide, mullite, chromia, iron chromite, magnesia, magnesium aluminate, aluminum nitride, boron nitride and the like, in an amount of from a trace amount up to about 70% by weight.

12. The subentry nozzle of claim 11 including a slagline sleeve portion formed around an exterior circumferential surface of said body adapted to contact a layer of fluid slag in a continuous casting mold during a casting operation.

13. The subentry nozzle of claim 12 wherein the body portion is constructed of an alumina-graphite refractory material and the slagline sleeve is of a zirconia-graphite refractory material.

14. The subentry nozzle of claim 12 wherein the body portion is composed of an alumina-graphite refractory material and the slagline sleeve is formed of a refractory material identical to that of the lining portion.

15. The subentry nozzle of claim 12 wherein the body portion and the slagline sleeve portion are formed of a refractory material identical to that of the lining portion.

* * * * *

UNITED STATES PATENT AND TRADEMARK OFFICE
CERTIFICATE OF CORRECTION

PATENT NO. : 4,870,037

DATED : September 26, 1989

INVENTOR(S) : Dale B. Hoggard and Han K. Park

It is certified that error appears in the above-identified patent and that said Letters Patent is hereby corrected as shown below:

Please add the missing drawing sheet, copy attached.

Column 1 Lines 18-19 "includes lide" should read --include slide--.

Column 1 Line 23 "THese" should read --These--.

Column 2 Line 13 "dispersedalumina" should read --dispersed alumina--.

Column 2 Line 41 after "2,135,918" insert --A--.

Column 2 Line 44 "modifiedgeometry" should read --modified geometry--.

Column 2 Line 48 "nozzleis" should read --nozzle is--.

Column 2 Line 65 "tot he" should read --to the--.

Column 3 Line 2 "aluminagraphite" should read --alumina-graphite--.

Column 3 Line 5 "exidation" should read --oxidation--.

UNITED STATES PATENT AND TRADEMARK OFFICE
CERTIFICATE OF CORRECTION

PATENT NO. : 4,870,037

DATED : September 26, 1989

INVENTOR(S) : Dale B. Hoggard and Han K. Park

It is certified that error appears in the above-identified patent and that said Letters Patent is hereby corrected as shown below:

Column 3 Line 35 "copendig" should read --co-pending--.

Column 3 Line 64 "O z 5" should read --$O > z \geq 5$--.

Column 4 Line 14 "inventionshown" should read --invention shown--.

Column 5 Lines 9-10 "expecially" should read --especially--.

Column 5 Line 24 "inventio" should read --invention--.

Column 6 Line 13 "maybe" should read --may be--.

Column 6 Lines 23-24 "commercialalumina-graphite" should read --commercial alumina-graphite--.

Column 6 Line 44 "dimensios" should read --dimensions--.

Column 6 Line 59 "particlesize" should read --particle size--.

UNITED STATES PATENT AND TRADEMARK OFFICE
CERTIFICATE OF CORRECTION

PATENT NO. : 4,870,037

DATED : September 26, 1989

INVENTOR(S) : Dale B. Hoggard and Han K. Park

It is certified that error appears in the above-identified patent and that said Letters Patent is hereby corrected as shown below:

Column 7 Line 25 before "SiAlON" insert --Sintered--.

Column 8 Line 67 "flawlesslyfor" should read --flawlessly for--.

Column 9 Line 18 "mormal" should read --normal--.

Column 9 Line 26 "inventin" should read --invention--.

Claim 1 (b) Line 43 Column 9 "SiALONhas" should read --SiALON has--.

Claim 6 Line 8 Column 10 "6" should read --5--.

Signed and Sealed this

Fifth Day of May, 1992

*Attest:*

DOUGLAS B. COMER

*Attesting Officer*   *Acting Commissioner of Patents and Trademarks*